United States Patent
Liu et al.

(10) Patent No.: US 11,436,129 B2
(45) Date of Patent: *Sep. 6, 2022

(54) SYSTEM, METHOD AND RECORDING MEDIUM FOR GENERATING MOBILE TEST SEQUENCES

(71) Applicant: International Business Machines Corporation, Armonk, NY (US)

(72) Inventors: Peng Liu, Yorktown Heights, NY (US); Marco Pistoia, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/784,686

(22) Filed: Feb. 7, 2020

(65) Prior Publication Data
US 2020/0174914 A1 Jun. 4, 2020

Related U.S. Application Data

(63) Continuation of application No. 15/843,227, filed on Dec. 15, 2017, now Pat. No. 10,671,517.

(51) Int. Cl.
| | | |
|---|---|---|
| G06F 11/36 | (2006.01) | |
| G06N 7/00 | (2006.01) | |
| G06N 3/08 | (2006.01) | |
| G06N 3/04 | (2006.01) | |
| G06N 3/00 | (2006.01) | |

(52) U.S. Cl.
CPC ...... *G06F 11/3684* (2013.01); *G06F 11/3664* (2013.01); *G06F 11/3688* (2013.01); *G06N 3/006* (2013.01); *G06N 3/0445* (2013.01); *G06N 3/08* (2013.01); *G06N 7/005* (2013.01)

(58) Field of Classification Search
CPC .. G06F 11/36; G06F 11/3664; G06F 11/3688; G06N 3/006
See application file for complete search history.

(56) References Cited

U.S. PATENT DOCUMENTS

| | | | | |
|---|---|---|---|---|
| 8,494,980 B2* | 7/2013 | Hans | .................... | G05B 13/026 |
| | | | | 706/12 |
| 8,683,494 B1* | 3/2014 | Prasad | .................... | G06F 9/542 |
| | | | | 719/318 |
| 9,619,362 B2* | 4/2017 | Li | ........................ | G06F 11/3664 |
| 9,652,360 B2* | 5/2017 | Prasad | ................ | G06F 11/3608 |
| 10,007,493 B1* | 6/2018 | Totale | ........................ | G06F 8/38 |
| 10,176,086 B2* | 1/2019 | Rogalla | ............... | G06F 11/3692 |
| 10,417,566 B2* | 9/2019 | Sarikaya | ................ | G06N 5/025 |
| 10,650,305 B2* | 5/2020 | Liu | ........................ | G06F 16/332 |

(Continued)

OTHER PUBLICATIONS

Anonymous, "UI/Application Exerciser Monkey", https://developer.android.com/studio/test/monkey.html, Aug. 25, 2020.

(Continued)

*Primary Examiner* — Kamini B Patel
(74) *Attorney, Agent, or Firm* — Peter Edwards, Esq.; McGinn I.P. Law Group, PLLC.

(57) ABSTRACT

A test sequence generation method, system, and computer program product, include creating an ε-greedy policy from a recurrent neural network (RNN) model to prioritize an action from an action sequence.

18 Claims, 4 Drawing Sheets

(56) References Cited

U.S. PATENT DOCUMENTS

| | | | | |
|---|---|---|---|---|
| 10,671,517 | B2* | 6/2020 | Liu | G06F 11/3684 |
| 2004/0073764 | A1* | 4/2004 | Andreasson | G06F 12/0253 |
| | | | | 711/170 |
| 2006/0224535 | A1* | 10/2006 | Chickering | G06N 20/00 |
| | | | | 706/16 |
| 2007/0198444 | A1* | 8/2007 | Movellan | G06N 3/008 |
| | | | | 706/12 |
| 2008/0155329 | A1* | 6/2008 | Kolman | G06F 11/263 |
| | | | | 714/33 |
| 2009/0299933 | A1* | 12/2009 | Aoyama | G06N 3/049 |
| | | | | 706/45 |
| 2010/0241243 | A1* | 9/2010 | Hans | G06N 20/00 |
| | | | | 700/12 |
| 2016/0253734 | A1* | 9/2016 | Ravikant | G06Q 30/0629 |
| | | | | 705/26.64 |
| 2016/0352656 | A1* | 12/2016 | Galley | G06N 3/0454 |
| 2017/0261949 | A1* | 9/2017 | Hoffmann | G06N 7/005 |
| 2017/0289338 | A1* | 10/2017 | Riva | H04L 67/02 |
| 2017/0289339 | A1* | 10/2017 | Riva | H04L 67/10 |
| 2018/0012121 | A1* | 1/2018 | Liu | G06N 3/08 |
| 2018/0095865 | A1* | 4/2018 | Rogalla | G06F 11/3692 |
| 2018/0197079 | A1 | 7/2018 | Dasgupta | |
| 2018/0197083 | A1 | 7/2018 | Dasgupta | |
| 2019/0065687 | A1* | 2/2019 | Mei | G06N 3/0445 |
| 2019/0188117 | A1* | 6/2019 | Liu | G06N 3/006 |
| 2020/0065703 | A1* | 2/2020 | Nag | G06N 7/005 |
| 2021/0153219 | A1* | 5/2021 | Sana | H04W 24/02 |

OTHER PUBLICATIONS

Tanzirul Azim, et al. "Targeted Nd depth-first exploration for systematic testing of android apps", OOPSLA '13: Proceedings of the 2013 ACM SIGPLAN international conference on Object oriented programming systems languages & applications Oct. 2013 pp. 641-660, https://doi.org/10.1145/2509136.2509549.

Volodymry Mnih, et al. "Human-level control through deep reinforcement learning", Nature 518, 529-533, https://www.nature.com/articles/nature14236, Feb. 25, 2015.

Mel, et al. "The NIST Definition of Cloud Computing". Recommendations of the National Institute of Standards and Technology. Nov. 16, 2015.

United States Notice of Allowance dated Jan. 27, 2020, in U.S. Appl. No. 15/843,227.

United States Office Action dated Dec. 18, 2019, in U.S. Appl. No. 15/843,227.

United States Office Action dated Sep. 23, 2019, in U.S. Appl. No. 15/843,227.

Azim et al., "Targeted and depth-first exploration for systematic testing of android apps," Proceeding OOPSLA '13 Proceedings of the 2013 ACM SIGPLAN international conference on Object oriented programming systems languages & applications pp. 641-660 Indianapolis, Indiana, USA, Oct. 2013.

Jensen et al., "Automated testing with targeted event sequence generation." Proceedings of the 2013 International Symposium on Software Testing and Analysis. ACM, 2013.

Minh et al., "Human-level control through deep reinforcement learning" Feb. 26, 2015 | vol. 518 | N A T U R E | 529.

Bauersfeld, et al., "User interface level testing with TESTAR; what about more sophisticated action specification and selection?." SAT-ToSE. 2014.

Esparcia-Alcazar et al. "Q-learning strategies for action selection in the TESTAR automated testing tool." 6th International Conferenrence on Metaheuristics and nature inspired computing (META 2016). 2016.

* cited by examiner

SYSTEM, METHOD AND RECORDING MEDIUM FOR GENERATING MOBILE TEST SEQUENCES

CROSS-REFERENCE TO RELATED APPLICATIONS

The present application is a Continuation Application of U.S. patent application Ser. No. 15/843,227, filed on Dec. 15, 2017, the entire contents of which are hereby incorporated by reference.

TECHNICAL FIELD

The present invention relates generally to a mobile test sequence generation method, and more particularly, but not by way of limitation, to a system, method, and recording medium for performing "monkey testing" using reinforcement learning.

BACKGROUND

A conventional way of automatically testing mobile applications (apps) is by randomly performing the actions in the User Interface (UI) screens (i.e., "monkey testing"). Each action sequence represents a use case that may be performed by the user in practice. The monkey testing can find the crashes/exceptions in the sequences it explored so that the developers may fix them before they are encountered by the users.

However, the monkey testing has severe problems caused by the randomness in the exploration and it may explore the same sequence for many times but missing some other sequences. Monkey testing is not considered to be as intelligent as human testing.

SUMMARY

In an exemplary embodiment, the present invention provides a method for generating test sequences including: collecting an action sequence; training a recurrent neural network (RNN) model to encode a frequency of actions in the action sequence and determine meaning action sequences; and applying the RNN model to prioritize the meaningful action sequences that have a frequency less than a predetermined threshold following the action sequence.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a test sequence generation method 100.

DETAILED DESCRIPTION

Figure 1:
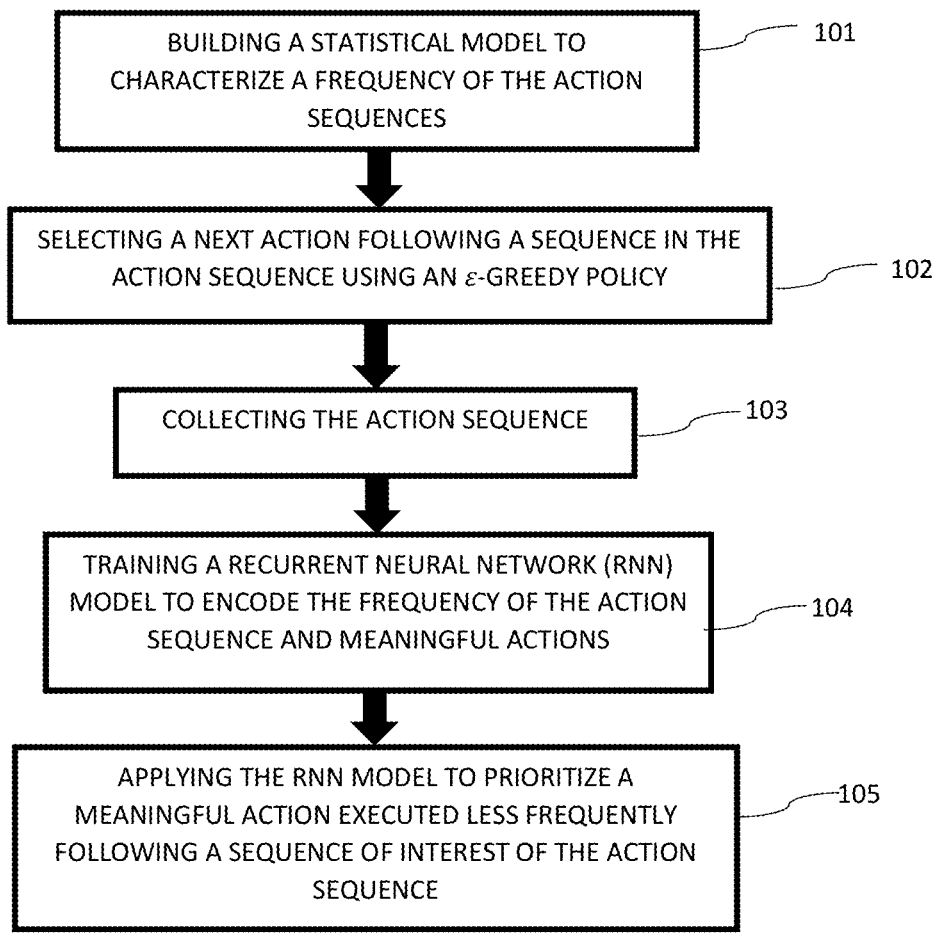

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

Users of mobile apps regularly perform various meaningful action sequences, e.g., to buy a product via an e-commerce mobile app, make a post in a social media mobile app, or view an insurance document in an insurance provider mobile app. Missing any action in a sequence or performing the actions following a different order will lead to the failure in achieving the "meaningful" results exemplified above. Due to this stringent requirement and the randomness nature of the monkey testing, the monkey testing can hardly generate the aforementioned meaningful action sequences. To simulate human users' meaningful action sequences and further explore more variants, embodiments of the present invention include a method based on reinforcement learning to automatically discover the meaningful action sequences.

With reference now to the example depicted in FIG. 1, the test sequence generation method 100 includes various steps to improve monkey testing with reinforcement learning. As shown in at least FIG. 2, one or more computers of a computer system 12 according to an embodiment of the present invention can include a memory 28 having instructions stored in a storage system to perform the steps of FIG. 1.

Although one or more embodiments (see e.g., FIGS. 2-4) may be implemented in a cloud environment 50 (see e.g., FIG. 3), it is nonetheless understood that the present invention can be implemented outside of the cloud environment.

With reference now to FIG. 1, the method 100 includes steps 101-105 that can cause systematic exploration without a scalability problem, model-based exploration that does not miss the internal program state changes, and monkey testing with less duplicated sequences and with finding more new sequences.

In one embodiment, an exemplary goal is to discover the meaningful action sequences that lead to the screens that are of special interest to human users. Such screens, which we refer to as the target screens, usually show some keywords such as "You have bought it successfully", "You have made a post successfully" and "Document open". Based on a predefined set of keywords, we recognize the target screens. The goal of the reinforcement learning (RL) is to, once it learns how to arrive at the target screens in some sample applications, quickly arrive at the target screens in all similar mobile applications. The RL can be interpreted as an optimization problem, which associates certain amount of rewards (e.g., $100) with the target screens and maximizes the rewards found by carefully picking the actions at every step.

In step 101, while the end goal is to reach the target screen, the RL also estimates the potential reward that can be eventually obtained by following an intermediate step. RL uses the estimation to guide the discovery of the rewards. In particular, on an intermediate screen, multiple buttons can be chosen and tapping one of them can lead to a new screen. The action (denoted as a) of tapping a button on the screen (denoted as S) is associated with a potential reward, denoted as Q(S,a). Intuitively, if the pair (S,a) can eventually lead to the target screen, Q(S,a) is a positive value and otherwise 0. Besides, if the pair (S,a) leads to the target screen after very few steps, Q(S,a) is close to the full amount of reward ($100) and if it leads to the target screen after many steps, Q(S,a) is much smaller than the full amount of reward. We build a deep neural network to estimate the Q value based on the input (S, a). In the following, we refer to it as the Q model for simplicity.

In step 102, a next action following a sequence in the action sequence is selected using a policy (i.e., an $\varepsilon$-greedy policy). In $\varepsilon$ probability, the next action is randomly selected (i.e., same as a monkey testing such as random clicking, etc.) and then in 1–$\varepsilon$ probability, the next action is selected to maximize Q(S,a) among all actions (or all buttons) available on the current screen S. Note that the policy decides what actions should be picked at every step to eventually reach the target screens. We adopt the $\varepsilon$-greedy policy, rather than the greedy-policy, because the Q model is computed (explained in next paragraph) under the observation of a limited set of screens/actions and the $\varepsilon$-greedy policy enlarges the observed set by introducing the uncertainty.

In step 103, the aforementioned Q model is computed and updated following the equation below. In particular, on a screen S, taking the action A will lead to a new screen S'. Once the new screen S' is observed, the Q model or Q values should be updated to produce the more up-to-date estimations. Suppose the action that has the maximal Q value on the screen S' is a, then Q(S,A) is updated using the maximal Q value under the assumption that RL will pick the best action on S'. In addition, the maximal Q value on the screen S' needs to be discounted (by multiplying with a discount factor) to estimate the Q value for the actions on the screen S because S is one step more than S' ahead of the target screens. Besides, R is 100 if the target screen is seen and 0 otherwise.

$$Q(S,A) \leftarrow Q(S,A) + \alpha(R + \gamma \max_a Q(S',a) - Q(S,A))$$

In step 105, the RL model is applied to produce the meaningful action sequences. In other words, the meaningful action sequences that human users can perform while the monkey testing usually fail to produce can now be produced by our RL agent.

Thus, the method 100 can perform much better than the monkey testing by collecting the action sequences, training the RNN model to encode the frequency, and applying the RNN model to prioritizes the less frequent meaningful actions following a sequence.

Moreover, the invention improves upon the monkey testing by using reinforcement learning. Reinforcement learning is a principal theory that provides intelligence for many autonomous systems such as robots. Besides, we leverage the NLP to recognize similar buttons, i.e., the buttons with the semantically similar labels, across different mobile apps. And we apply the computer vision to recognize similar screens across different mobile apps. In this way, our RL agent can be generalized to different mobile apps even if they have not been seen during the training.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
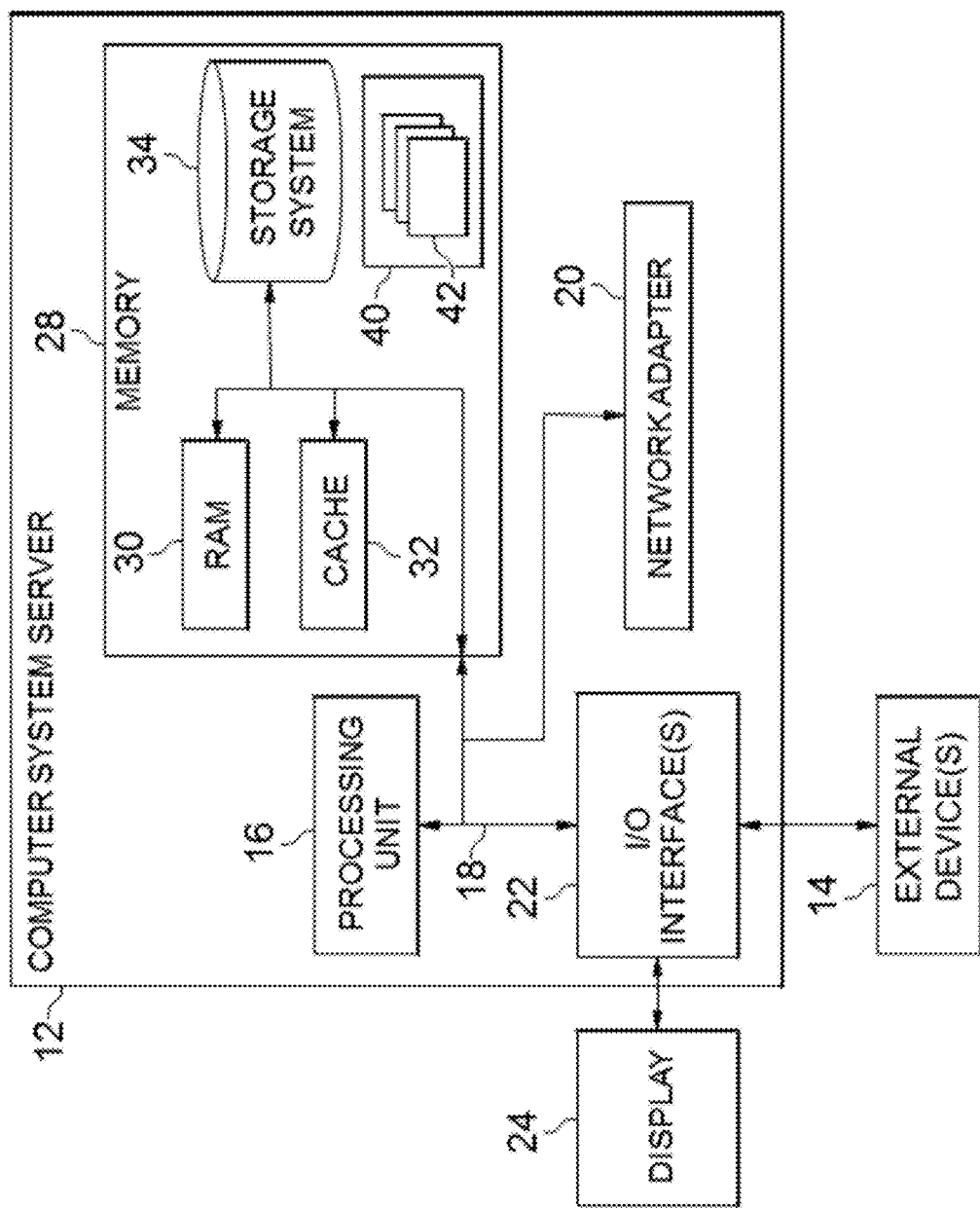
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard. Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
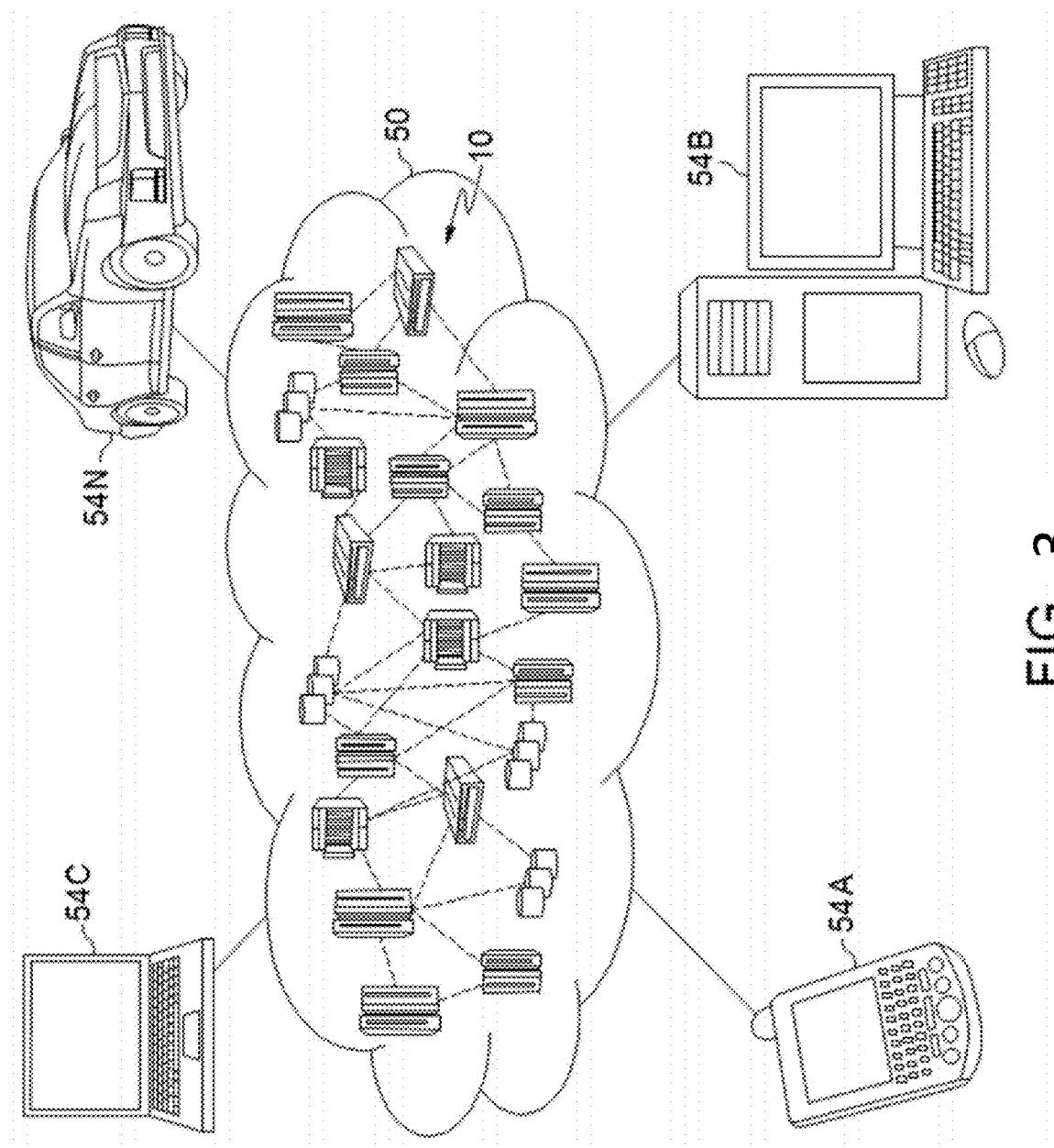
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
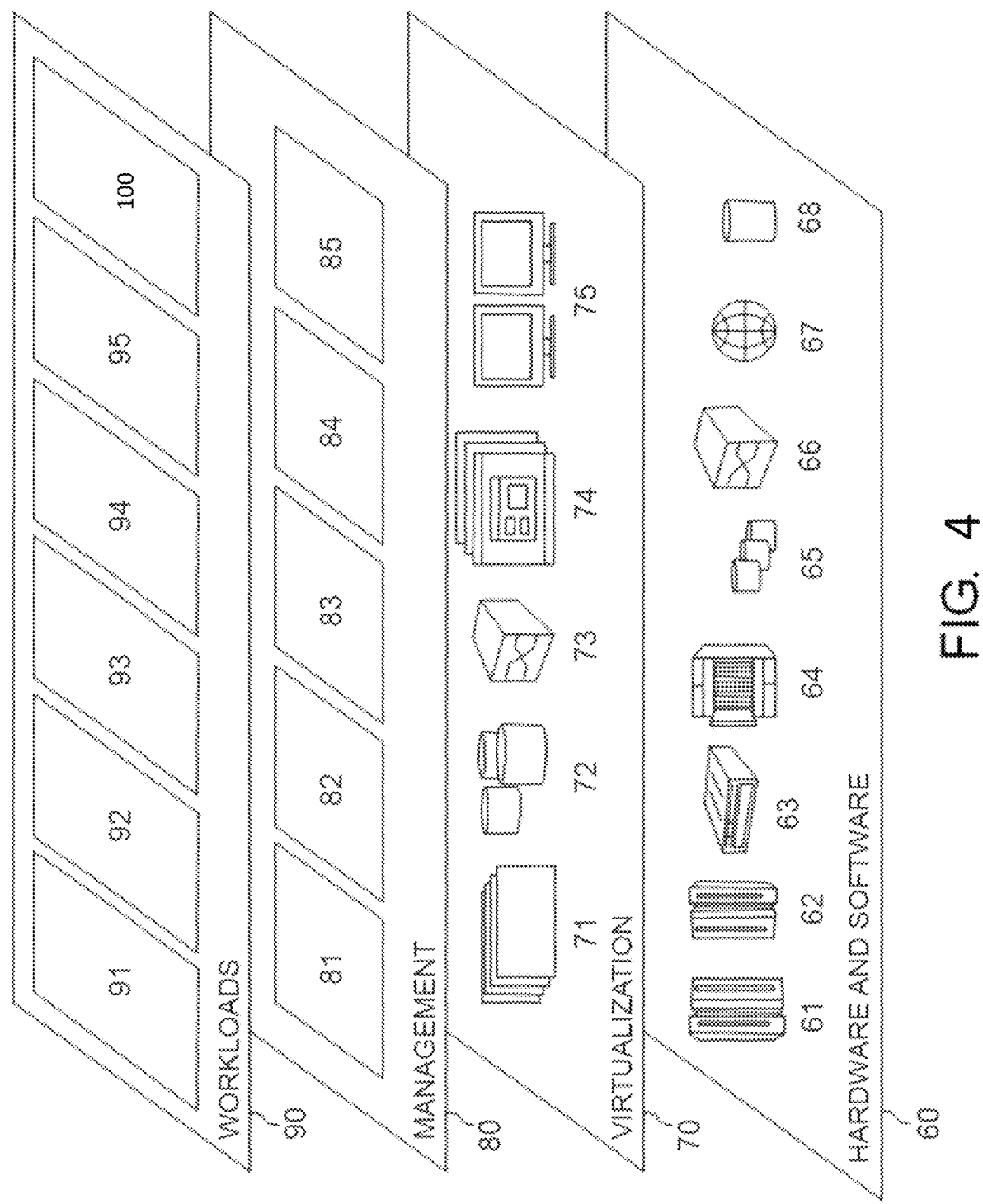
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the Mobile test sequence generation method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented test sequence generation method, the method comprising:
   creating an ε-greedy policy from a recurrent neural network (RNN) model to prioritize an action from an action sequence that has a frequency less than a predetermined threshold following a testing of the action sequence; and
   selecting a next action for testing, based on the ε-greedy policy, during the testing of the action sequence.

2. The computer-implemented method of claim 1, wherein the ε-greedy policy comprises:
   in ε probability, the next action is randomly selected; and
   in 1−ε probability, the next action is selected such that the next action is the least likely according to the statistical model.

3. The computer-implemented method of claim 1, wherein a statistical model is further built to characterize the frequency of the action.

4. The computer-implemented method of claim 1, wherein the action comprises a meaningful action sequence which causes a program to result in a successful entry.

5. The computer-implemented method of claim 4, wherein, in a training, the RNN model learns the meaningful action sequence based on recognizing a predefined set of keywords indicating a successful action sequence.

6. The computer-implemented method of claim 1, wherein the testing comprising Monkey testing.

7. The computer-implemented method of claim 1, wherein the ε-greedy policy literarily prioritizes a different action from the action sequence that has a frequency less than a lower predetermined threshold following the testing of the action in the action sequence.

8. The computer-implemented method of claim 1, wherein the RNN model is trained to encode a frequency of actions in the action sequence and determine meaningful action sequences, and
   wherein the action from the action sequence that is prioritized is selected from the meaningful action sequences.

9. A computer program product, the computer program product comprising a computer-readable storage medium having program instructions embodied therewith, the program instructions executable by a computer to cause the computer to perform:

creating an ε-greedy policy from a recurrent neural network (RNN) model to prioritize an action from an action sequence that has a frequency less than a predetermined threshold following a testing of the action sequence; and selecting a next action during the testing based on the ε-greedy policy.

10. The computer program product of claim 9, wherein the ε-greedy policy comprises:

in ε probability, the next action is randomly selected; and in 1−ε probability, the next action is selected such that the next action is the least likely according to the statistical model.

11. The computer program product of claim 9, wherein a statistical model is further built to characterize the frequency of the action.

12. The computer program product of claim 9, wherein the action comprises a meaningful action sequence which causes a program to result in a successful entry.

13. The computer program product of claim 12, wherein, in a training, the RNN model learns the meaningful action sequence based on recognizing a predefined set of keywords indicating a successful action sequence.

14. A test sequence generation system, said system comprising:

a processor; and a memory, the memory storing instructions to cause the processor to perform:

creating an ε-greedy policy from a recurrent neural network (RNN) model to prioritize an action from an action sequence that has a frequency less than a predetermined threshold following a testing of the action sequence; and selecting a next action during the testing based on the ε-greedy policy.

15. The test sequence generation system of claim 14, wherein the ε-greedy policy comprises:

in ε probability, the next action is randomly selected; and in 1−ε probability, the next action is selected such that the next action is the least likely according to the statistical model.

16. The test sequence generation system of claim 14, wherein a statistical model is further built to characterize the frequency of the action.

17. The test sequence generation system of claim 14, wherein the action comprises a meaningful action sequence which causes a program to result in a successful entry.

18. The test sequence generation system of claim 17, wherein, in a training, the RNN model learns the meaningful action sequence based on recognizing a predefined set of keywords indicating a successful action sequence.

* * * * *